US010509766B2

(12) United States Patent
Bach et al.

(10) Patent No.: US 10,509,766 B2
(45) Date of Patent: Dec. 17, 2019

(54) STORING AND RETRIEVING RESTRICTED DATASETS TO AND FROM A CLOUD NETWORK WITH NON-RESTRICTED DATASETS

(71) Applicant: INTERNATIONAL BUSINESS MACHINES CORPORATION, Armonk, NY (US)

(72) Inventors: Dave Bach, Phoenix, AZ (US); Nicholas Fragiskatos, Tucson, AZ (US); Andrew B. Trinh, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 120 days.

(21) Appl. No.: 15/345,431

(22) Filed: Nov. 7, 2016

(65) Prior Publication Data
US 2018/0129665 A1 May 10, 2018

(51) Int. Cl.
G06F 16/11 (2019.01)
G06F 16/182 (2019.01)
G06F 16/13 (2019.01)

(52) U.S. Cl.
CPC ......... G06F 16/116 (2019.01); G06F 16/113 (2019.01); G06F 16/13 (2019.01); G06F 16/1844 (2019.01)

(58) Field of Classification Search
CPC ......... G06F 17/30076; G06F 17/30091; G06F 16/116; G06F 16/1844; G06F 16/113; G06F 16/13
See application file for complete search history.

(56) References Cited

U.S. PATENT DOCUMENTS 6,557,089 B1 4/2003 Reed et al.
7,287,181 B2 10/2007 Thompson
9,183,243 B2 11/2015 Gensler, Jr. et al.
9,471,786 B1 10/2016 Buendgen et al.
(Continued)

FOREIGN PATENT DOCUMENTS

CN 103701834 4/2014

OTHER PUBLICATIONS

PCT Search Report and Written Opinion dated Jan. 29, 2018, for Application Serial No. PCT/IB2017/056344 filed Oct. 13, 2017, Applicant No. TUC160107, pp. 11.
(Continued)

Primary Examiner — Jay A Morrison
(74) Attorney, Agent, or Firm — Janaki K. Davda; Konrad Raynes Davda & Victor LLP

(57) ABSTRACT

Provided are techniques for storing and retrieving restricted datasets to and from a cloud network with non-restricted datasets. A request to dump datasets from one or more storage devices to the cloud storage is received, wherein the datasets include restricted datasets and non-restricted datasets, and wherein the restricted datasets are in a format that is not supported by the cloud storage. The restricted datasets are identified. The restricted datasets are converted to a format that is supported by the cloud storage to generate converted datasets. The converted datasets and the non-restricted datasets are dumped to one container in the cloud storage.

21 Claims, 10 Drawing Sheets

(56) References Cited

U.S. PATENT DOCUMENTS

| | | | |
|---|---|---|---|
| 2011/0004630 A1* | 1/2011 | LaBerge | G06F 17/30076 707/796 |
| 2014/0046906 A1* | 2/2014 | Patiejunas | G06F 21/606 707/661 |
| 2015/0012570 A1* | 1/2015 | Le | G06F 9/45558 707/823 |
| 2015/0113240 A1 | 4/2015 | Abrams et al. | |
| 2016/0117226 A1* | 4/2016 | Hetrick | G06F 11/1451 711/162 |
| 2016/0294649 A1* | 10/2016 | Russell | G06F 11/00 |
| 2017/0199887 A1* | 7/2017 | Fullbright | G06F 11/1458 |

OTHER PUBLICATIONS

English translation of CN103701834 dated Apr. 2, 2014, pp. 11.

"IBMDFSMSdss: Product overview—z/OS Storage software", IBM Corporation,[online][retrieved Jun. 29, 2016] http://www-03.ibm.com/systems/z/os/zos/features/software/dfsms/dss/.

P. Mell, et al., "Effectively and Securely Using the Cloud Computing Paradigm", National Institute of Standards and Technology (NIST), Information Technology Laboratory, Oct. 7, 2009, pp. 80.

P. Mell, et al., "The NIST Definition of Cloud Computing", National Institute of Standards and Technology (NIST), Special Publication 800-145, Sep. 2011, pp. 7.

"Dump Dataset syntax for logical data set", IBM Corporation, [online][retrieved Oct. 30, 2016] http://www.ibm.com/support/knowledgecenter/SSLTBW_2.1.0/com.ibm.zos.v2r1.adru00 . . . , pp. 2.

"Restore Dataset syntax for logical data set", IBM Corporation, [online][retrieved Oct. 30, 2016] http://www.ibm.com/support/knowledgecenter/SSLTBW_2.1.0/com.ibm.zos.v2r1.adru00 . . . , pp. 2.

Patents Acts 1977: Examination Report under Section 18(3) dated Jul. 22, 2019, pp. 5, for Application No. GB1907099.4.

Response, dated Sep. 19, 2019, to Patents Acts 1977: Examination Report under Section 18(3) dated Jul. 22, 2019 pp. 2, for Application No. GB1907099.4.

\* cited by examiner

STORING AND RETRIEVING RESTRICTED DATASETS TO AND FROM A CLOUD NETWORK WITH NON-RESTRICTED DATASETS

FIELD

Embodiments of the invention relate to storing and retrieving restricted datasets to and from a cloud network with non-restricted datasets.

BACKGROUND

A storage controller manages physical disk drives and presents them to the computer as logical units. A Data Facility Storage Management System (DFSMS) dss (DFSMSdss®) application may be described as a DFSMS functional component or base element that is used to copy, move, dump, and restore datasets and volumes. (DFSMSdss® is a trademark of International Business Machines Corporation in the United States and/or other countries.)

Currently, in an effort to reduce Millions of Instructions Per Second (MIPS), the DFSMSdss® application offloads storing and retrieving of datasets to the storage controller. As a result, datasets that require additional logical processing, such as validating and re-blocking are restricted, which means that these datasets cannot be dumped to the cloud. Oftentimes, when dumping a group of datasets, it may be frustrating to have some datasets be rejected by the DFSMSdss® application for cloud processing. From the user's standpoint, this restriction makes managing backups to the cloud more complex since supported/nonsupported datasets cannot be stored with each other in the cloud. A dump may be described as a backup of datasets in a specific format. Unlike copy/move, which preserves the original format of the datasets, when a dump is made, the datasets are packaged into a format that contains metadata and data pertaining to the datasets.

SUMMARY

Provided is a computer program product for storing a restricted dataset to cloud storage in a cloud node of a cloud network. The computer program product comprises a computer readable storage medium having program code embodied therewith, the program code is executable by at least one processor to perform: receiving a request to dump datasets from one or more storage devices to the cloud storage, wherein the datasets include restricted datasets and non-restricted datasets, and wherein the restricted datasets are in a format that is not supported by the cloud storage; identifying the restricted datasets; converting the restricted datasets to a format that is supported by the cloud storage to generate converted datasets; and dumping the converted datasets and the non-restricted datasets to one container in the cloud storage.

Provided is a computer system for storing a restricted dataset to cloud storage in a cloud node of a cloud network. The computer system comprises a mainframe comprising one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations comprising: receiving a request to dump datasets from one or more storage devices to the cloud storage, wherein the datasets include restricted datasets and non-restricted datasets, and wherein the restricted datasets are in a format that is not supported by the cloud storage; identifying the restricted datasets; converting the restricted datasets to a format that is supported by the cloud storage to generate converted datasets; and dumping the converted datasets and the non-restricted datasets to one container in the cloud storage.

Provided is a method for storing a restricted dataset to cloud storage in a cloud node of a cloud network. The method comprises: receiving, with a processor of a computer, a request to dump datasets from one or more storage devices to the cloud storage, wherein the datasets include restricted datasets and non-restricted datasets, and wherein the restricted datasets are in a format that is not supported by the cloud storage; identifying the restricted datasets; converting the restricted datasets to a format that is supported by the cloud storage to generate converted datasets; and dumping the converted datasets and the non-restricted datasets to one container in the cloud storage.

Thus, embodiments advantageously store both restricted and non-restricted datasets to the cloud storage.

With embodiments, the restricted datasets are converted to a flat file with a sequential format. Such a flat file is advantageous in that it may be stored to the cloud storage.

Also, with embodiments, the request to dump comprises a dump command with CLOUD, CONTAINER, and OBJECTPREFIX keywords.

Moreover, with embodiments, the one container comprises a folder in a cloud file system for the cloud storage. Embodiments advantageously store both the non-restricted datasets and the restricted datasets (in converted form) in one folder in the cloud storage.

Also, in response to receiving a request to restore the datasets from the container, embodiments restore the non-restricted datasets directly from the cloud storage to the one or more storage devices. Such direct restoring efficiently restores the non-restricted datasets.

In addition, in response to receiving a request to restore the datasets from the container, embodiments restore the converted datasets from the cloud storage to the one or more storage devices and re-convert the converted datasets to generate restricted datasets in an original format. This advantageously provides the datasets in their original format.

Furthermore, with embodiments, the request to restore comprises a restore command with CLOUD, CONTAINER, and OBJECTPREFIX keywords.

BRIEF DESCRIPTION OF THE SEVERAL VIEWS OF THE DRAWINGS

Referring now to the drawings in which like reference numbers represent corresponding parts throughout.

DETAILED DESCRIPTION

Figure 1:
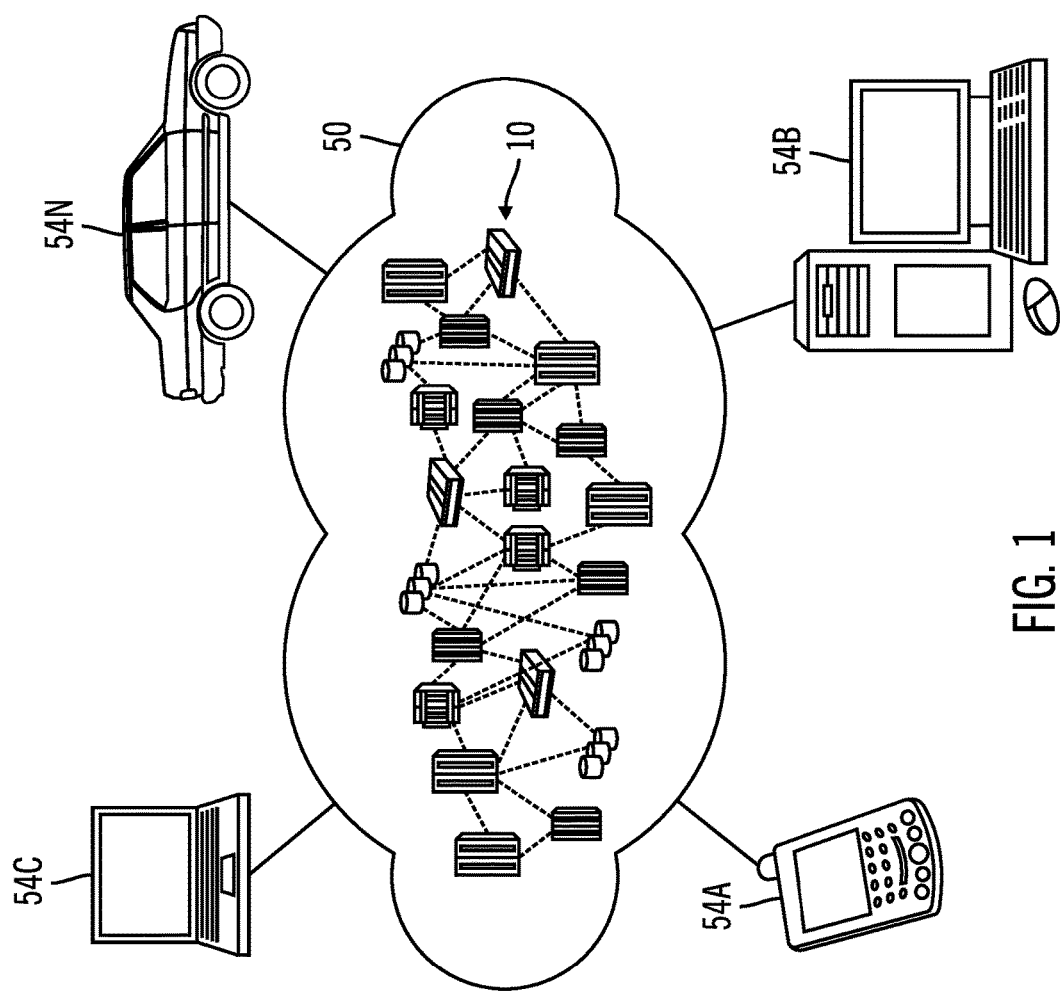
FIG. 1 illustrates a cloud computing environment in accordance with certain embodiments.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
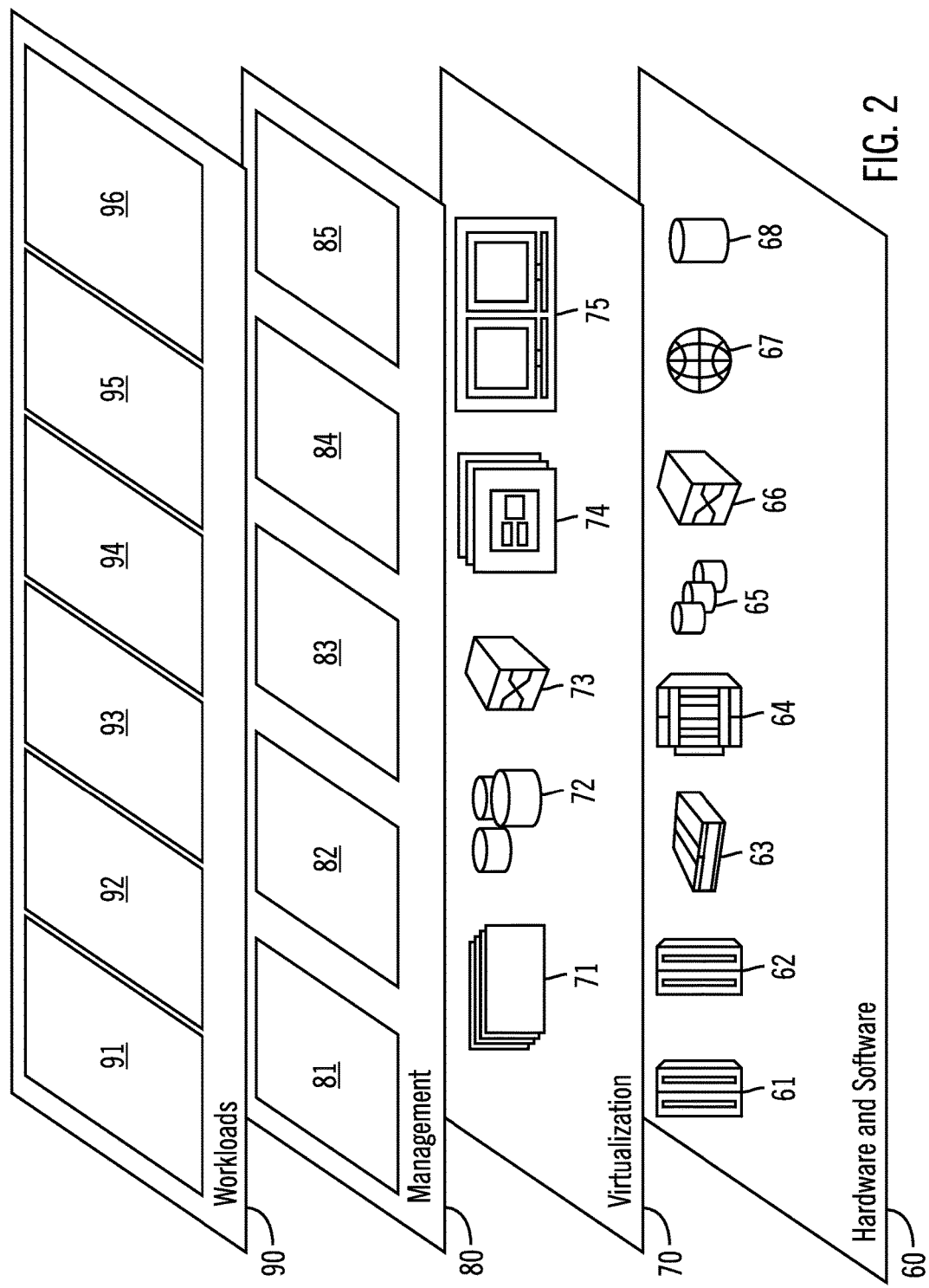
FIG. 2 illustrates abstraction model layers in accordance with certain embodiments.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and storing and retrieving restricted datasets to and from a cloud network with non-restricted datasets 96.

Thus, in certain embodiments, software or a program, implementing storing and retrieving restricted datasets to and from a cloud network with non-restricted datasets in accordance with embodiments described herein, is provided as a service in a cloud environment.

Figure 3:
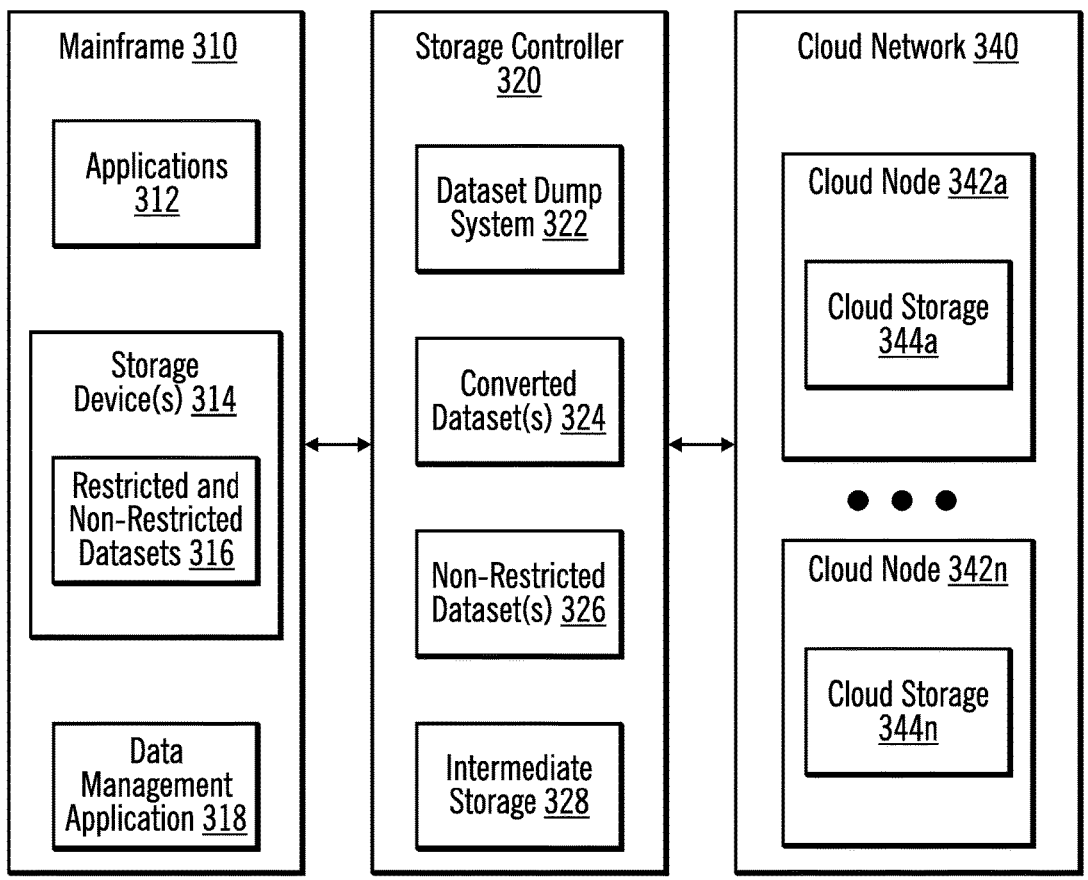
FIG. 3 illustrates, in a block diagram, a computing environment in accordance with certain embodiments.

FIG. 3 illustrates, in a block diagram, a computing environment in accordance with certain embodiments. In FIG. 3, a mainframe 310 is coupled to a storage controller 320, and the storage controller 320 is coupled to a cloud network 340. The cloud network 340 may be implemented in the manner described with reference to FIGS. 1 and 2. The mainframe 310 includes applications 312, one or more storage devices 314 (e.g., Direct Access Storage Devices (DASDs)), and a data management application 318 (e.g., a Data Facility Storage Management System (DFSMS) dss (DFSMSdss®) application)). The DASDs 314 store restricted and non-restricted datasets 316. With embodiments, the non-restricted datasets may also be referred to as cloud supported datasets, while the restricted datasets may also be referred to as cloud non-supported datasets. The non-restricted datasets are in a format that is supported by the cloud storage.

The restricted datasets are in a format that require additional logical processing, such as validating and re-blocking, that is required in order to store the restricted datasets into cloud storage. The applications 312 write data to storage devices 314.

All types of datasets are potentially cloud compatible. The ones that are not cloud compatible are the ones that have attributes that require the mainframe 310 to do additional processing in order to restore the datasets.

For example, the following attributes will make a dataset incompatible with the cloud.

X'1' The dataset resides on a particular type of device (e.g., a 3380 direct access storage device available from International Business Machines (IBM) Corporation).

X'2' The dataset is a multi-layered Virtual Storage Access Method (VSAM) dataset.

X'3' The dataset is a single striped multi-volume version 1 type.

X'4' The block size between the source and target does not match.

X'5' The dataset is a VSAM dataset that has key ranges.

X'6' The dataset is a Key-Sequenced Dataset (KSDS) that has embedded indexes.

X'7' The dataset is a VSAM dataset where a high used Relative Byte Address (RBA) equals to a High Allocated Relative Byte Address (HARBA).

X'8' Control Area (CA)/Control Interval (CI) sizes between source and targets do not match.

X'9' The dataset is a VSAM dataset that has an incompatible CA size.

X'A' The dataset is an integrated catalog facility user catalog.

X'B' The dataset is a multi-volume extended format version 2 sequential dataset has an end of file on a volume other than the last.

X'C' The VSAM dataset has a CA size less than 15, was allocated by tracks, and has a track count greater than 16,777,215.

DASDs may be described as storage devices in which each physical record has a discrete location and a unique address. DASDs include, for example, disk drives, magnetic drums, data cells, and optical disc drives. The storage controller 320 includes a dataset dump system 322, one or more converted dump datasets 324, one or more non-restricted datasets 326, and intermediate storage 328. The converted dump datasets 324 represent restricted datasets that were converted to a format that may be stored in the cloud network 340. The cloud network 340 includes cloud nodes 342a . . . 342n that include cloud storage 344a . . .

344n, respectively. The dataset dump system 322 dumps datasets (both restricted and non-restricted) from the storage devices 314 to the cloud storage 344a . . . 344n.

With embodiments, the dataset dump system 322 leverages a dump/restore to/from the storage devices function to create a converted dump dataset 324 for the restricted datasets that are rejected for cloud processing.

SAM stands for Sequential Access Method. A SAM dump dataset is a flat file. A flat file may be described as a dataset with a sequential format and with no hierarchical structure. In certain embodiments, the converted dataset is in SAM format. In other embodiments, the converted dump dataset may be in other. However, dumps are usually written in sequential format because dumps have been traditionally written to tape, which is sequentially accessed.

The dataset dump system 322 is able to store the converted dump datasets 324, along with the non-restricted datasets (i.e., datasets which are supported by the dump/restore to/from the storage devices function). Embodiments advantageously have both cloud supported and cloud non-supported datasets up on the cloud in the same cloud container without the need to manage multiple backups. Embodiments advantageously aggregate all the restricted, cloud non-supported datasets, and place them in a container dataset that is cloud supported and backup the container with the other cloud supported datasets. In order to place a restricted dataset in cloud storage, embodiments add three new keywords to existing functions. With embodiments, the keywords CLOUD, CONTAINER, and OBJECTPREFIX are added to the existing DUMP commands and RESTORE commands and apply to logical processing. With embodiments, the CONTAINER and OBJECTPREFIX keywords are specified when specifying the CLOUD keyword.

Figure 4:
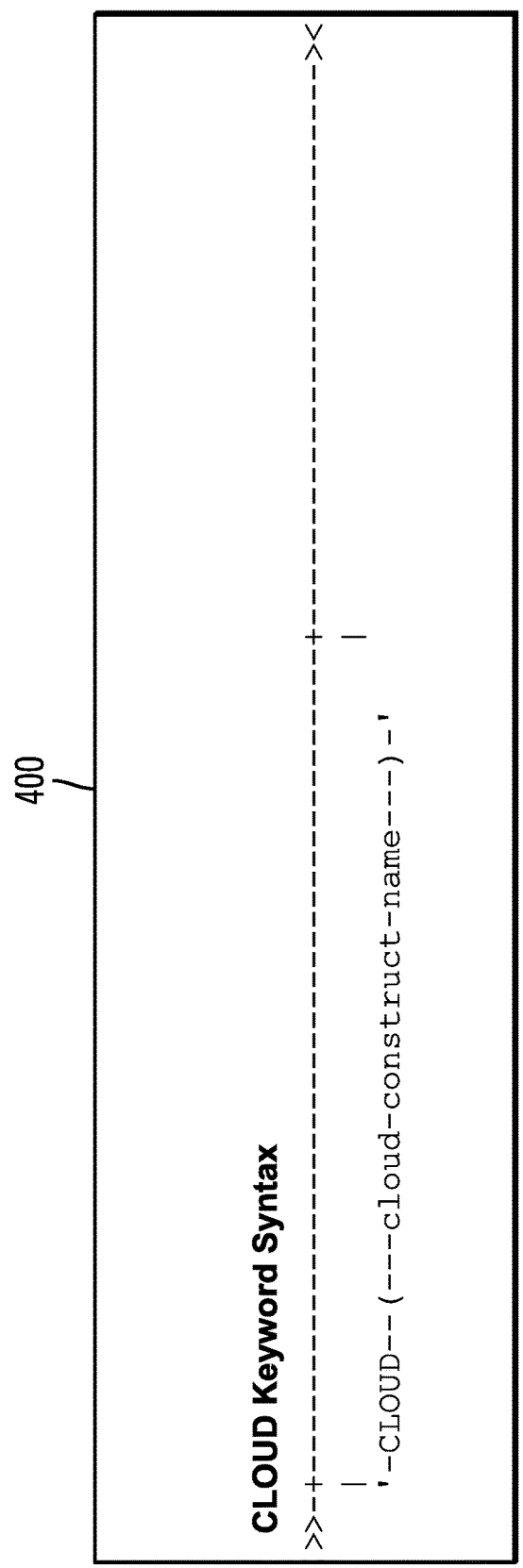
FIG. 4 illustrates a CLOUD keyword syntax as used in a dump command or a restore command in accordance with certain embodiments.

FIG. 4 illustrates a CLOUD keyword syntax 400 as used in a dump command or a restore command in accordance with certain embodiments. The CLOUD keyword is a parameter that accepts as input a cloud construct name. The cloud construct contains information about a cloud, such as the name of a cloud and account/tenant information. Storage administrators may configure cloud constructs, and the data management application 318 will use the information within the construct when dumping and restoring datasets. The construct name may be up to 30 bytes.

With embodiments, the data management application 318 may call another function to obtain a storage class or management class definition or to determine which storage group is associated with a specific storage device (e.g., DASD) volume.

Figure 5:
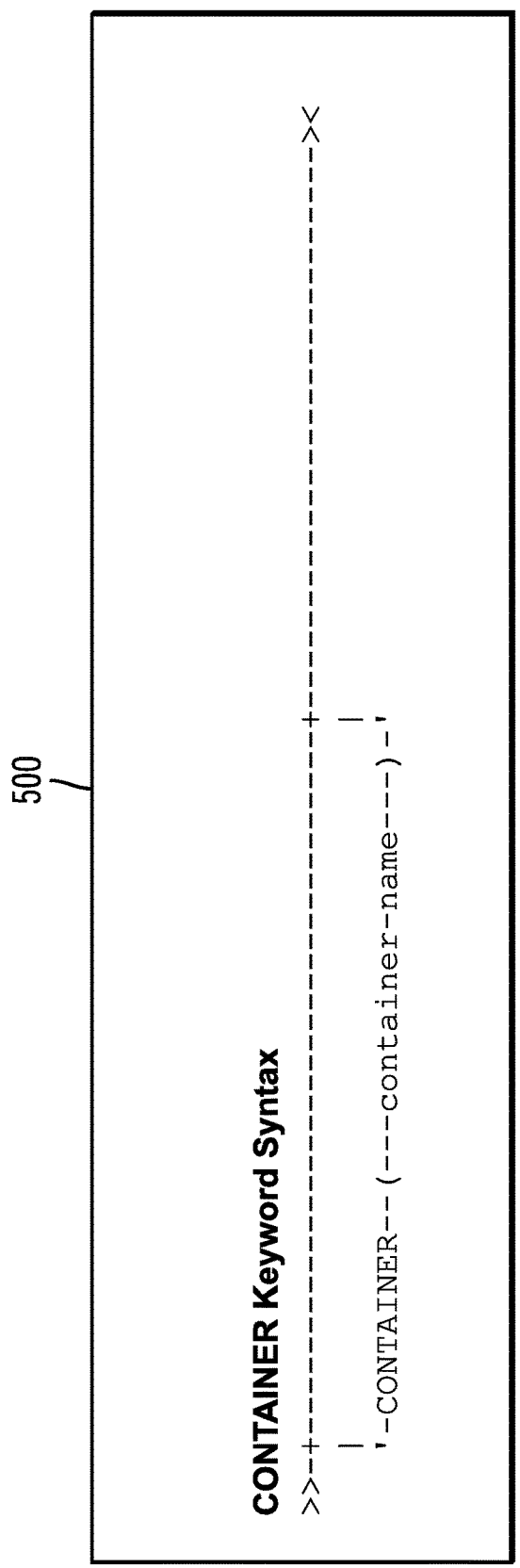
FIG. 5 illustrates a CONTAINER keyword syntax as used in a dump command or a restore command in accordance with certain embodiments.

FIG. 5 illustrates a CONTAINER keyword syntax 500 as used in a dump command or a restore command in accordance with certain embodiments. The CONTAINER keyword is a parameter that specifies a location under an account where the objects are stored. Container names may be 128 bytes in length and cannot contain a forward slash. Access to objects within a container are protected using read and write Access Control Lists (ACLs). Once granted access to a container, access is provided to all of the objects within that container.

Figure 6:
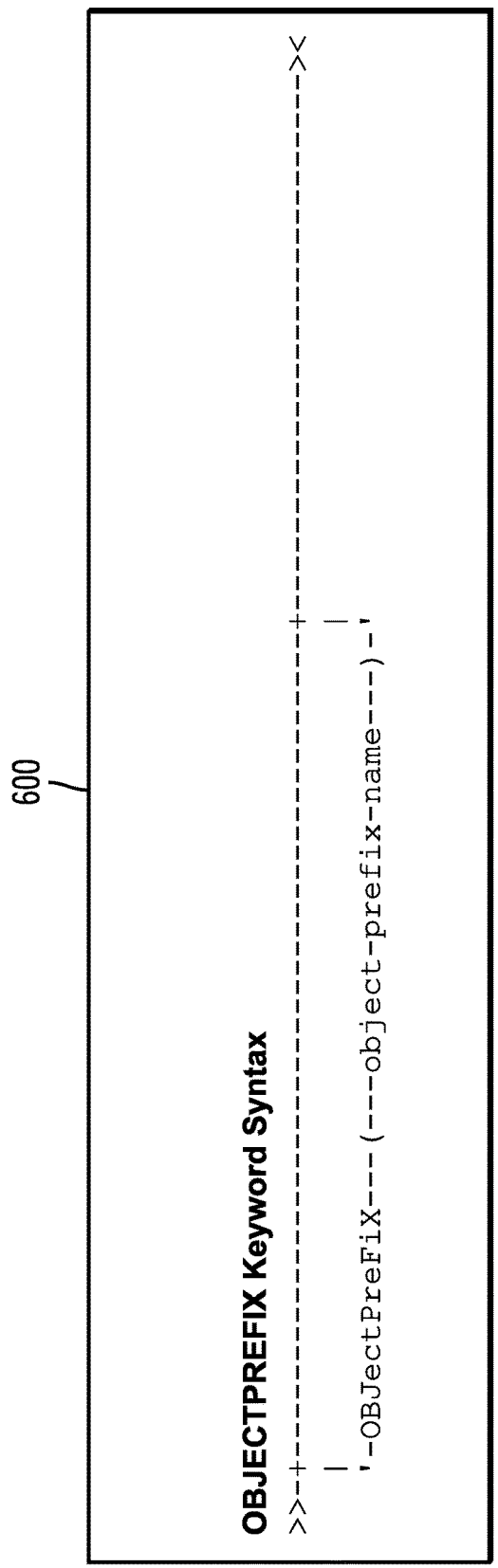
FIG. 6 illustrates an OBJECTPREFIX keyword syntax as used in a dump command or a restore command in accordance with certain embodiments.

FIG. 6 illustrates an OBJECTPREFIX keyword syntax 600 as used in a dump command or a restore command in accordance with certain embodiments. The OBJECTPREFIX keyword is a parameter that specifies a prefix name that the data management application 318 prepends to the name of the object that is stored under the container specified where the objects are stored. Object names may be up to 128 bytes in length so to ensure that the data management application 318 does not exceed the limit defined by the MC STORE function. With embodiments, the object prefix may not exceed 44 bytes. Access to objects within a container are protected using read and write ACLs. Once granted access to a container, access is provided to all of the objects within that container. The data management application 318 creates three sets of objects when storing a dataset to the cloud storage. A first object is a meta data object that contains attributes of the dataset (e.g., DataSet Control Blocks, non-VSAM Volume Record (NVR), VSAM Volume Record (VVR), etc.). A second object is the data object. A third object is an application meta data object that may be passed in by the application. The three data objects represent the data that resided on the tracks where the dataset resided on the storage device (e.g., DASD).

With embodiments, there will be a meta and data object per volume where the source dataset resides. This means that if the dataset that is dumped resides on 3 volumes, there will be a meta and data object for each one of those volumes. If the dataset is an indexed VSAM dataset that resides on two volumes, there will be a meta and data object for each component where the dataset resides on DASD. In order to simplify the support, the data management application 318 may be creating many more objects for meta data.

ADRTAPB is the name of a macro that maps out the dump tape or dump dataset records, while DTHDR, DTDSHDR, and DTSPHERE are sub-structures found within the ADRTAPB macro. DTTTRK is a sub-structure that is part of the ADRTAPB macro and helps to map out the tracks of data. With embodiments, objects may consist of ADRTAPB records, for example DTHDR, DTDSHDR, DTSPHERE, etc. As for the data objects, which would be similar to DTTTRK records, these objects may consist of extent ranges and there may only be a data object per dataset per volume.

Figure 7:
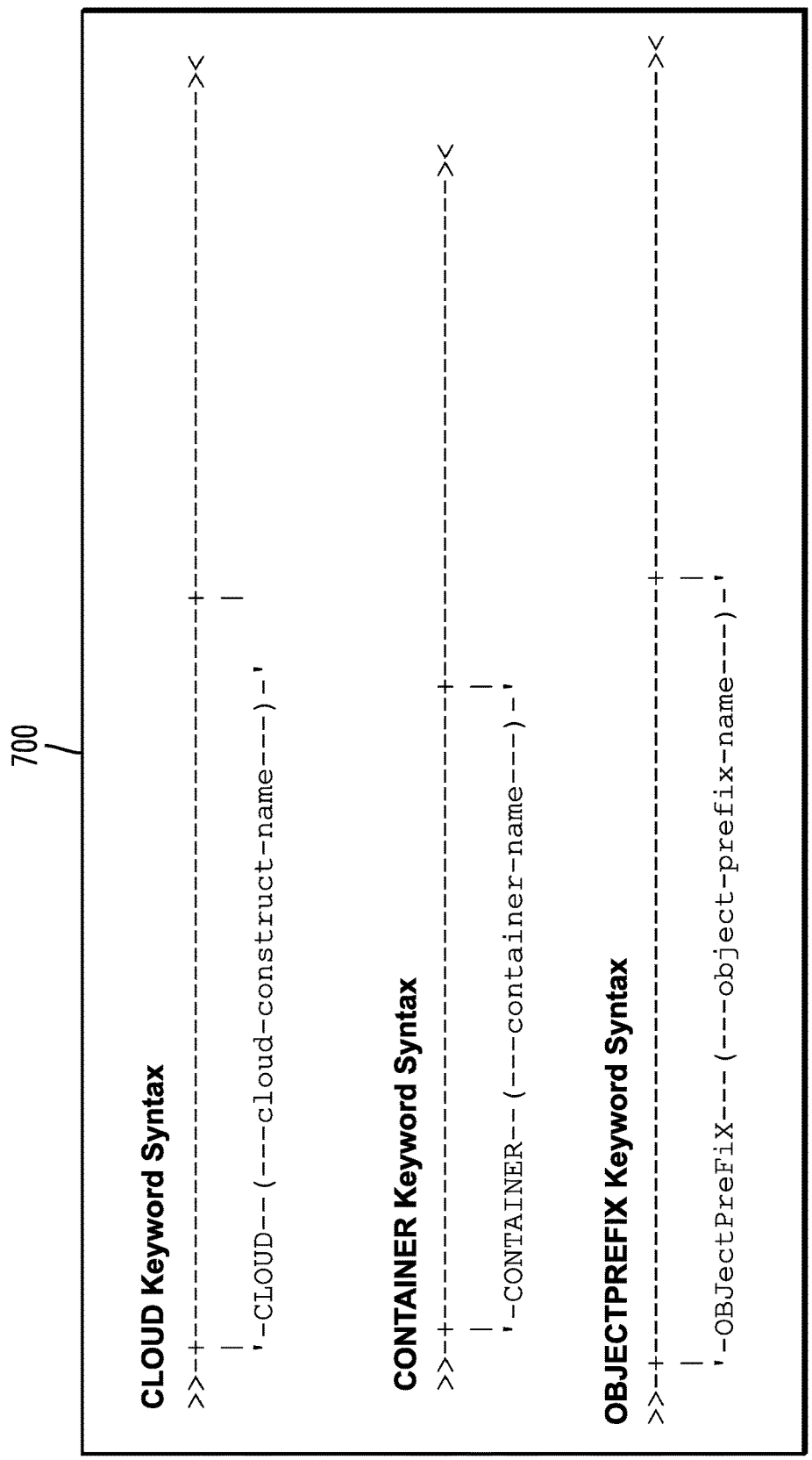
FIG. 7 illustrates keywords for a dump command or a restore command in accordance with embodiments.

FIG. 7 illustrates keywords 700 for a dump command or a restore command in accordance with embodiments. For example, either the dump command or the restore command used by embodiments includes the keywords: CLOUD, CONTAINER, and OBJECTPREFIX. Other keywords may also be used in the dump command or the restore command.

In certain embodiments, the new keywords CLOUDCREDENTIALS and DEBUG are available. The CLOUDCREDENTIALS keyword is a parameter that specifies an up to 64 character credential that is used when authenticating with a cloud. The DEBUG keyword is a parameter. DEBUG may be used as a diagnostic tool by including DEBUG CLMSG and a sub-parameter (of MINIMAL, SUMMARIZED or DETAILED) in the dump or restore command. When the CLMSG subkeyword is specified, the data management application 318 issues messages that provide details on the progress of a backup to cloud storage. DEBUG(CLMSG) is specified as follows with one of the following sub-keywords:

DEBUG CLMSG(MINIMAL)—specifies that the data management application 318 is not to issue any messages that provide detail on the progress of a backup to cloud storage.

DEBUG CLMSG(SUMMARIZED)—Specifies that the data management application 318 is to issue an informational message for each object that is stored to cloud storage.

DEBUG CLMSG(DETAILED)—Specifies that the data management application 318 is to provide detailed information about each Hyper Text Transfer Protocol (HTTP) request that is made to an object in cloud storage.

With embodiments, when DEBUG(CLMSG) is not specified, the processing for MINIMAL is the default.

Figure 8:
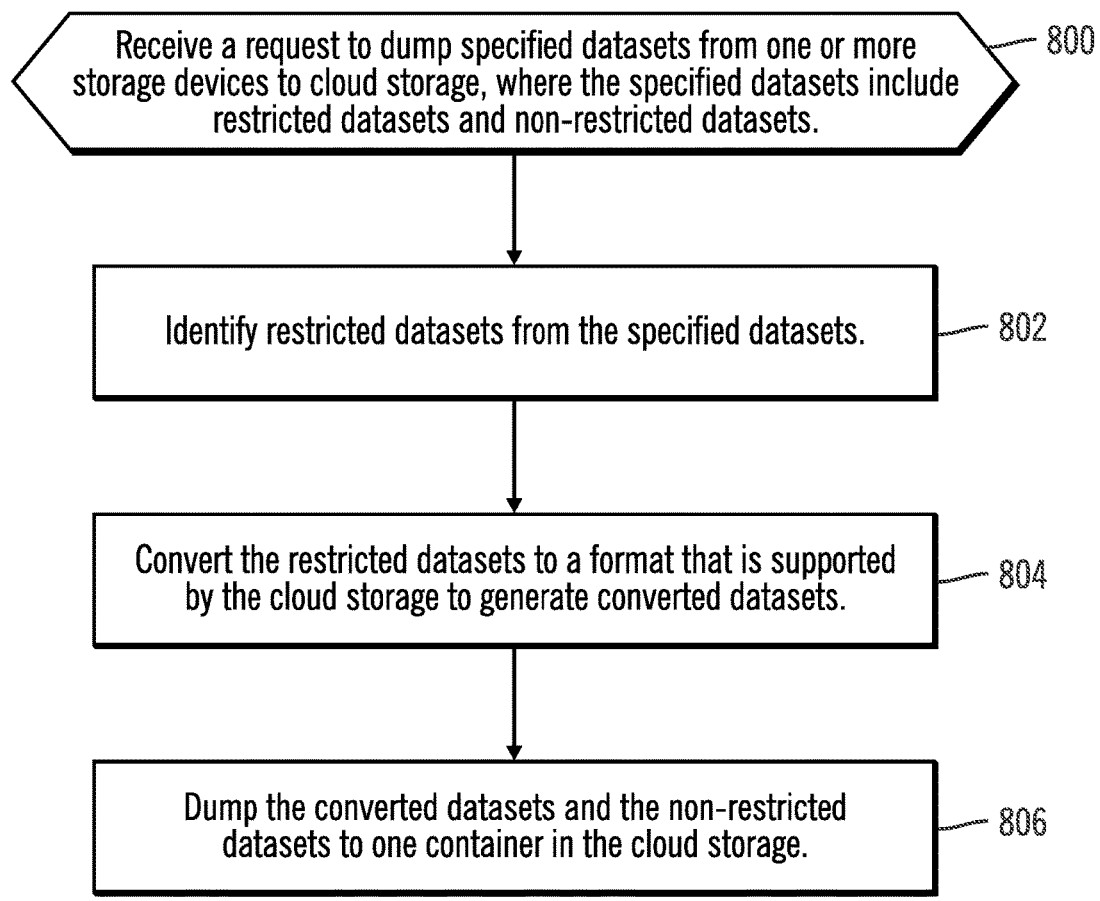
FIG. 8 illustrates, in a flow chart, operations for dumping datasets from one or more storage devices to cloud storage in accordance with certain embodiments.

FIG. 8 depicts, in a flow chart, operations for dumping datasets from one or more storage devices to cloud storage in accordance with certain embodiments. The loud storage is in a cloud node of a cloud network. Control begins at block 800 with the dataset dump system 122 receiving (from the data management application 318 of the mainframe 110) a request to dump (specified datasets from one or more storage devices to cloud storage, where the specified datasets include restricted datasets and non-restricted datasets. The request to dump may be a dump command with CLOUD, CONTAINER, and OBJECTPREFIX keywords and, optionally, CLOUDCREDENTIALS and/or DEBUG keywords. In block 802, the dataset dump system 122 identifies restricted datasets from the specified datasets. In certain embodiments, the dataset dump system 122 identifies a list of datasets that cannot be dumped to the cloud and performs a DUMP to the cloud using typrun=norun. Typrun=norun is command for a function of the data management application 318 that instructs the mainframe 310 to run a mock dump to get a list of datasets. In this case, for typrun=norun, the function of the data management application 318 provides a list of datasets that cannot be dumped to the cloud. Thus, Typrun=norun may be described as an option to filter for restricted datasets that are not supported for cloud storage. Then, the dataset dump system 122 extracts all datasets from the one or more storage devices to form a new dataset and then extracts the restricted datasets from the new dataset. Then, the new dataset contains the non-restricted datasets, and the new dataset may be directly dumped to and restored from the cloud storage. The dataset dump system 122 creates a list of the restricted datasets (which failed to be dumped to cloud storage).

In block 804, the dataset dump system 122 converts the restricted datasets to a format that is supported by the cloud storage to generate converted datasets. In certain embodiments, the dataset dump system 122 dumps datasets (using a DUMP function) from the list to one or more storage devices to create a sequential dump dataset, which is give an arbitrary dataset name (e.g., cloud.dump). The DUMP function converts datasets that were restricted from the could into one flat file that is cloud compatible.

In block 806, the dataset dump system 122 dumps the converted datasets and the non-restricted datasets to one container in cloud storage. A dump container, may be described as a folder in the cloud file system for the cloud storage. That is, the dump container is a portion of the cloud storage. In certain embodiments, the dataset dump system 122 dumps the sequential dump dataset, along with the non-restricted datasets, to cloud storage by specifying a container and an objectprefix. The container is akin to a folder, and the object prefix is similar to the file name. The container and objectprefix together are used to store and locate (for retrieval) the dump. With embodiments, a list of dataset names is stored along with the datasets in the cloud storage. With embodiments, for each non-restricted dataset, the dataset dump system 122 creates an entry in the dataset name list cloud object.

Figure 9:
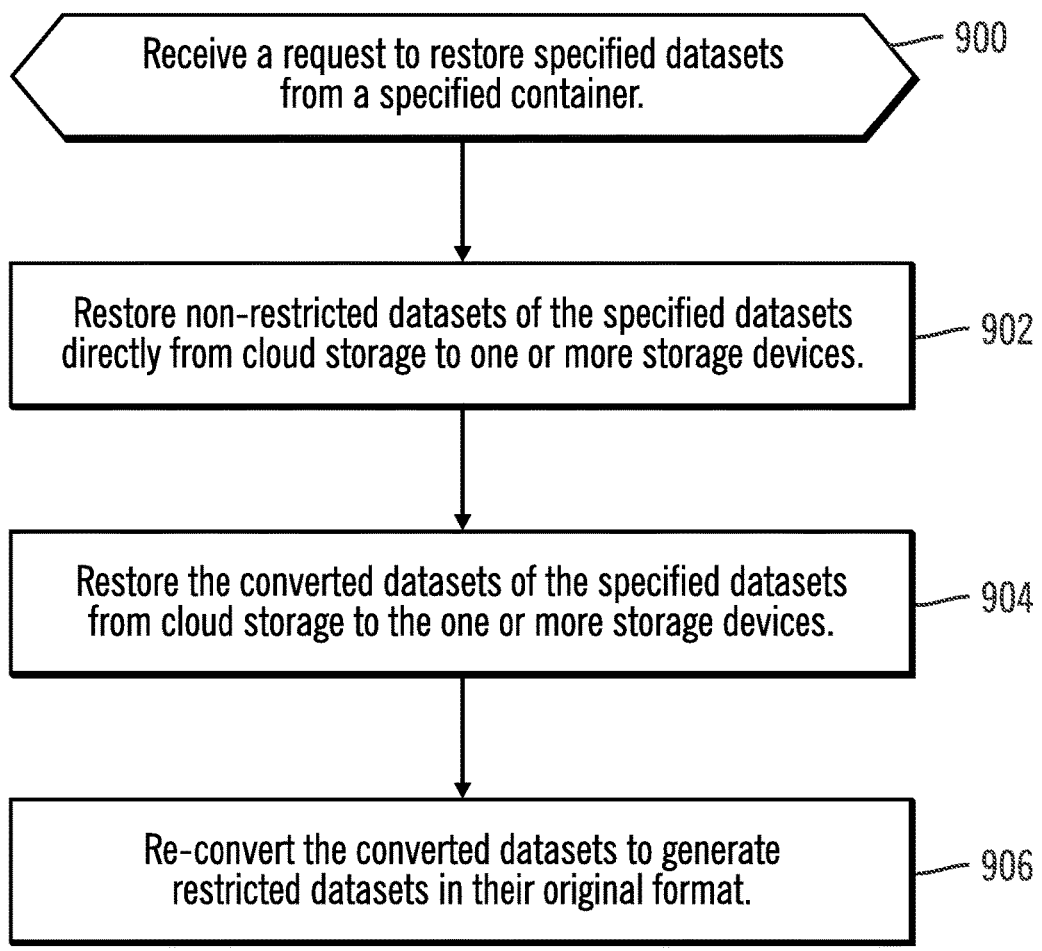
FIG. 9 illustrates, in a flow chart, operations for restoring datasets from cloud storage to one or more storage devices in accordance with certain embodiments.

FIG. 9 depicts, in a flow chart, operations for restoring datasets from cloud storage to one or more storage devices in accordance with certain embodiments. Control begins at block 900 with the dataset dump system 122 receiving (from the data management application 318 of the mainframe 110 a request to restore specified datasets from a specified container. The request to restore may be a restore command with CLOUD, CONTAINER, and OBJECTPREFIX keywords and, optionally, CLOUDCREDENTIALS and/or DEBUG keywords. In certain embodiments, the dataset dump system 122, to restore, uses the data management application 318 to specify the datasets to be restored, along with the specified objectprefix and container.

In block 902, the dataset dump system 122 restores non-restricted datasets of the specified datasets directly from cloud storage to the one or more storage devices. With embodiments, for each dataset that was cloud dumpable (i.e., has an entry in the dataset name list cloud object), the dataset dump system 122 restores the dataset directly.

In block 904, the dataset dump system 122 restores the converted datasets of the specified datasets from cloud storage to the one or more storage devices. With embodiments, for each dataset that was not cloud dumpable, the dataset dump system 122 restores the sequential dump dataset that was dumped with the arbitrary name (e.g., cloud.dump) from the cloud storage to the one or more storage devices. In block 906, the dataset dump system 122 re-converts the converted datasets to generate restricted datasets in their original format. With embodiments, the dataset sump system 122 performs a DASD RESTORE from the sequential dump dataset to return the sequential dump dataset to original form (i.e., to the restricted dataset).

Thus, embodiments, in cloud data storage, while performing a dump of data to the cloud, filter out cloud non-supported data and aggregate by dumping to intermediate storage 328 (in the storage controller 320) as a container that is arranged to be cloud supported, and dump the container to the same cloud storage as the cloud supported data.

Embodiments store datasets with addition self-describing metadata. This metadata includes the list of datasets that get stored, what storage device they were stored on, and information about the original storage devices.).

Embodiments address when the data management application 318 attempts to dump data to the cloud, and the format of a source dataset is not compatible with cloud storage. Embodiments filter incompatible data from an input stream, enclose it in a packet with data in a compatible cloud format, and then upload the compatible packet to the cloud, taking care to maintain information in the packet to support reload from the cloud when desired.

Figure 10:
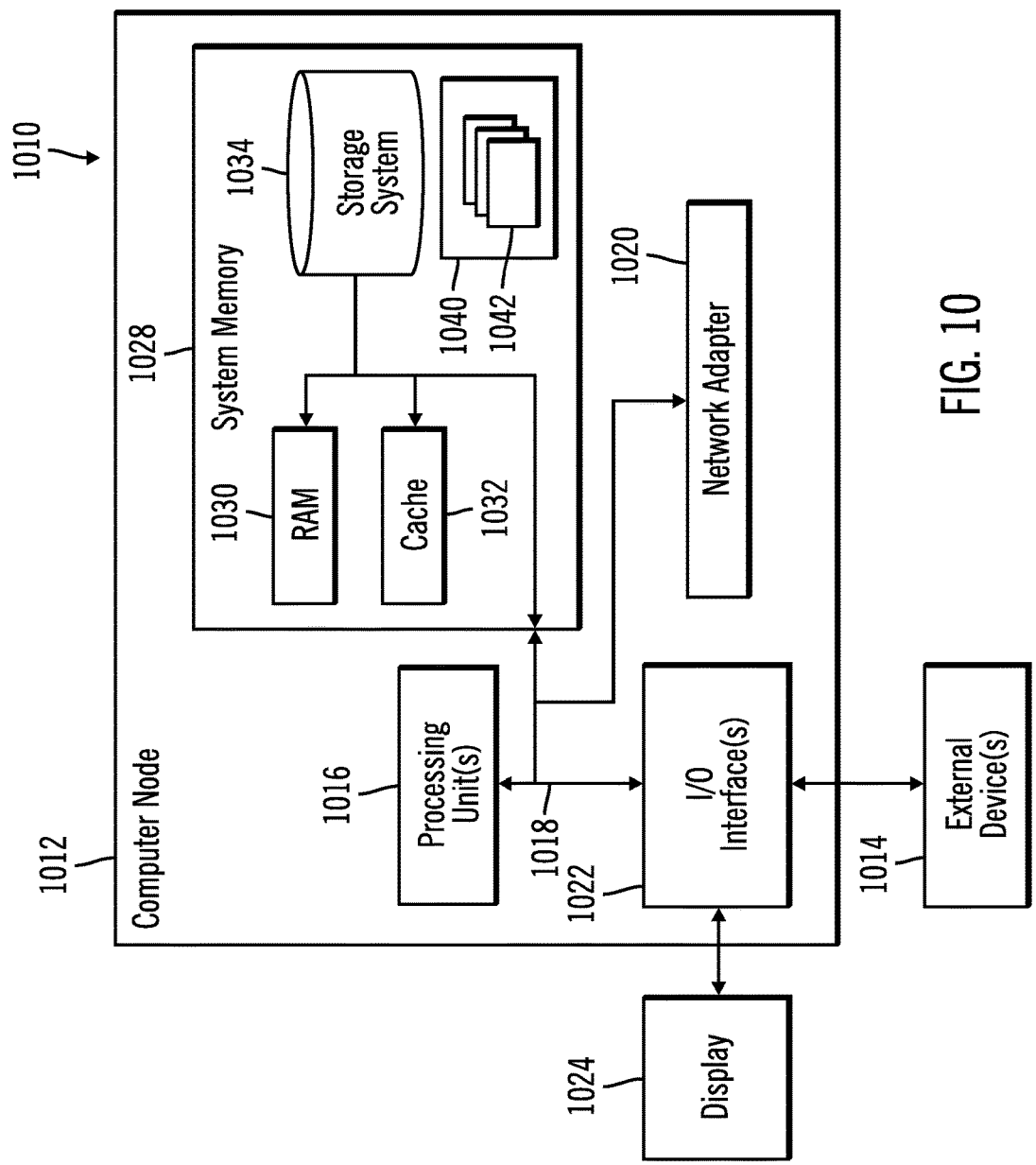
FIG. 10 illustrates a computing node in accordance with certain embodiments.

FIG. 10 illustrates a computing environment 1010 in accordance with certain embodiments. In certain embodiments, the computing environment is a cloud computing environment. Referring to FIG. 10, computer node 1012 is only one example of a suitable computing node and is not intended to suggest any limitation as to the scope of use or functionality of embodiments of the invention described herein. Regardless, computer node 1012 is capable of being implemented and/or performing any of the functionality set forth hereinabove.

The computer node 1012 may be a computer system, which is operational with numerous other general purpose or special purpose computing system environments or configurations. Examples of well-known computing systems, environments, and/or configurations that may be suitable for use with computer node 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 1012 may be described in the general context of computer system executable instructions, such as program modules, being executed by a computer system. Generally, program modules may include routines, programs, objects, components, logic, data structures, and so on that perform particular tasks or implement particular abstract data types. Computer node 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer node 1012 in cloud computing node 1010 is shown in the form of a general-purpose computing device. The components of computer node 1012 may include, but are not limited to, one or more processors or processing units 1016, a system memory 1028, and a bus 1018 that couples various system components including system memory 1028 to one or more processors or processing units 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 1012 typically includes a variety of computer system readable media. Such media may be any available media that is accessible by computer node 1012, and it includes both volatile and non-volatile media, removable and non-removable media.

System memory 1028 can include computer system readable media in the form of volatile memory, such as random access memory (RAM) 1030 and/or cache memory 1032. Computer node 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, system memory 1028 may include at least one program product having a set (e.g., at least one) of program modules that are configured to carry out the functions of embodiments of the invention.

Program/utility 1040, having a set (at least one) of program modules 1042, may be stored in system memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer node 1012 may also communicate with one or more external devices 1014 such as a keyboard, a pointing device, a display 1024, etc.; one or more devices that enable a user to interact with computer node 1012; and/or any devices (e.g., network card, modem, etc.) that enable computer node 1012 to communicate with one or more other computing devices. Such communication can occur via Input/Output (I/O) interfaces 1022. Still yet, computer node 1012 can communicate with one or more networks such as a local area network (LAN), a general wide area network (WAN), and/or a public network (e.g., the Internet) via network adapter 1020. As depicted, network adapter 1020 communicates with the other components of computer node 1012 via bus 1018. It should be understood that although not shown, other hardware and/or software components could be used in conjunction with computer node 1012. Examples, include, but are not limited to: microcode, device drivers, redundant processing units, external disk drive arrays, RAID systems, tape drives, and data archival storage systems, etc.

In certain embodiments, the mainframe 110, the storage controller 120, and/or cloud computing nodes 10 have the architecture of computer node 1012.

Additional Embodiment Details

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for storing restricted datasets to cloud storage in a cloud node of a cloud network, the computer program product comprising a computer readable storage medium having program code embodied therewith, the program code executable by at least one processor to perform operations for:
   receiving a request to dump datasets from one or more storage devices to the cloud storage, wherein the datasets include the restricted datasets and non-restricted datasets, wherein the restricted datasets are in a format that is not supported by the cloud storage, wherein the non-restricted datasets are in a format that is supported by the cloud storage, and wherein the request specifies a container with a container name for storing both the restricted datasets in converted form and the non-restricted datasets in the cloud storage;
   identifying the restricted datasets;
   converting the restricted datasets to a single converted dataset that has a format that is supported by the cloud storage, wherein the single converted dataset comprises a flat file with a sequential format; and
   dumping the single converted dataset and the non-restricted datasets to the container with the container name in the cloud storage.

2. The computer program product of claim 1, wherein the request to dump comprises a dump command with a cloud construct name, the container name, and an object prefix name.

3. The computer program product of claim 1, wherein the container with the container name comprises a folder in a cloud file system for the cloud storage.

4. The computer program product of claim 1, wherein the program code is executable by the at least one processor to perform further operations for:
   in response to receiving a request to restore the datasets from the container, restoring the non-restricted datasets directly from the cloud storage to the one or more storage devices.

5. The computer program product of claim 1, wherein the program code is executable by the at least one processor to perform further operations for:
   in response to receiving a request to restore the datasets from the container,
      restoring the single converted dataset from the cloud storage to the one or more storage devices; and
      re-converting the single converted dataset to generate restricted datasets in an original format.

6. The computer program product of claim 5, wherein the request to restore comprises a restore command with a cloud construct name, the container name, and an object prefix name.

7. The computer program product of claim 1, wherein a Software as a Service (SaaS) is configured to perform the operations of the computer program product.

8. A computer system for storing restricted datasets to cloud storage, wherein the computer system is coupled to a mainframe, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
receiving a request to dump datasets from one or more storage devices to the cloud storage, wherein the datasets include the restricted datasets and non-restricted datasets, wherein the restricted datasets are in a format that is not supported by the cloud storage, wherein the non-restricted datasets are in a format that is supported by the cloud storage, and wherein the request specifies a container with a container name for storing both the restricted datasets in converted form and the non-restricted datasets in the cloud storage;
identifying the restricted datasets;
converting the restricted datasets to a single converted dataset that has a format that is supported by the cloud storage, wherein the single converted dataset comprises a flat file with a sequential format; and
dumping the single converted dataset and the non-restricted datasets to the container with the container name in the cloud storage.

9. The computer system of claim 8, wherein the request to dump comprises a dump command with a cloud construct name, the container name, and an object prefix name.

10. The computer system of claim 8, wherein the container with the container name comprises a folder in a cloud file system for the cloud storage.

11. The computer system of claim 8, wherein the operations further comprise:
in response to receiving a request to restore the datasets from the container, restoring the non-restricted datasets directly from the cloud storage to the one or more storage devices.

12. The computer system of claim 8, wherein the operations further comprise:
in response to receiving a request to restore the datasets from the container,
restoring the single converted dataset from the cloud storage to the one or more storage devices; and
re-converting the single converted dataset to generate restricted datasets in an original format.

13. The computer system of claim 12, wherein the request to restore comprises a restore command with a cloud construct name, the container name, and an object prefix name.

14. The computer system of claim 8, wherein a Software as a Service (SaaS) is configured to perform the operations of the computer system.

15. A method for storing restricted datasets to cloud storage in a cloud node of a cloud network, comprising operations for:
receiving, with a processor of a computer, a request to dump datasets from one or more storage devices to the cloud storage, wherein the datasets include the restricted datasets and non-restricted datasets, wherein the restricted datasets are in a format that is not supported by the cloud storage, wherein the non-restricted datasets are in a format that is supported by the cloud storage, and wherein the request specifies a container with a container name for storing both the restricted datasets in converted form and the non-restricted datasets in the cloud storage;
identifying the restricted datasets;
converting the restricted datasets to a single converted dataset that has a format that is supported by the cloud storage, wherein the single converted dataset comprises a flat file with a sequential format; and
dumping the single converted dataset and the non-restricted datasets to the container with the container name in the cloud storage.

16. The method of claim 15, wherein the request to dump comprises a dump command with a cloud construct name, the container name, and an object prefix name.

17. The method of claim 15, wherein the container with the container name comprises a folder in a cloud file system for the cloud storage.

18. The method of claim 15, further comprising operations for:
in response to receiving a request to restore the datasets from the container, restoring the non-restricted datasets directly from the cloud storage to the one or more storage devices.

19. The method of claim 15, further comprising operations for:
in response to receiving a request to restore the datasets from the container,
restoring the single converted dataset from the cloud storage to the one or more storage devices; and
re-converting the single converted dataset to generate restricted datasets in an original format.

20. The method of claim 19, wherein the request to restore comprises a restore command with a cloud construct name, the container name, and an object prefix name.

21. The method of claim 15, wherein a Software as a Service (SaaS) is configured to perform the operations of the method.

* * * * *